United States Patent [19]

Fukano et al.

[11] Patent Number: 5,224,449
[45] Date of Patent: Jul. 6, 1993

[54] LEAN-BURN INTERNAL COMBUSTION SYSTEM

[75] Inventors: Yukiyoshi Fukano, Izumiotsu, Japan; Susumu Ariga, San Antonio, Tex.

[73] Assignee: Osaka Gas Company, Ltd., Japan

[21] Appl. No.: 786,041

[22] Filed: Oct. 31, 1991

[51] Int. Cl.⁵ .............................................. F02B 19/16
[52] U.S. Cl. .............................. 123/267; 123/169 PA; 123/193.6; 123/279
[58] Field of Search ................. 123/26, 256, 266, 267, 123/276, 279, 295, 169 PA, 193.6, 169 V

[56] References Cited

U.S. PATENT DOCUMENTS

| | | | |
|---|---|---|---|
| 1,310,970 | 7/1919 | Stroud | 123/169 V X |
| 1,759,162 | 5/1930 | Lang | 123/279 X |
| 2,034,855 | 3/1936 | Alby | 123/169 P A |
| 2,076,030 | 4/1937 | Kahllenberger | 123/275 |
| 3,897,769 | 8/1975 | Jozlin | 123/279 X |
| 3,908,625 | 9/1975 | Romy | 123/267 |
| 4,175,531 | 11/1979 | Tanahashi | 123/193.6 |
| 4,319,552 | 3/1982 | Sauer et al. | 123/267 X |
| 4,898,135 | 2/1990 | Failla et al. | 123/279 X |

FOREIGN PATENT DOCUMENTS

| | | |
|---|---|---|
| 53-46508 | 4/1978 | Japan . |
| 58-40522 | 3/1983 | Japan . |
| 1-108349 | 7/1989 | Japan . |

OTHER PUBLICATIONS

"Increased Mixing Rate Using an Energy Cell in a Two-Stroke, Spark-Assisted DI Diesel Engine" Ariga, Wood & Matsushita International Congress & Exposition Detroit, Mich. Feb. 29–Mar. 4, 1988.

*Primary Examiner*—Tony M. Argenbright
*Attorney, Agent, or Firm*—Baker & Botts

[57] ABSTRACT

A toroidal chamber in a piston communicating through an orifice at a top face of the piston located in an internal combustion system, such as a spark ignition engine or a compression ignition engine. The chamber arranged to receive a fuel/air mixture so that a flame front, propagated in a main combustion chamber outside the toroidal chamber reaches the toroidal chamber, the fuel in the toroidal chamber burns. The burning creates pressure in the chamber that exceeds the pressure in the main combustion chamber. The combustion gas of high pressure is jetted out of the toroidal chamber into the main combustion chamber. The high pressure combustion gas jet generates turbulence and mixing in the main combustion chamber, contributing to an improved combustion. Accordingly, the power output and the thermal efficiency of the internal combustion system is improved.

7 Claims, 6 Drawing Sheets

LEAN-BURN INTERNAL COMBUSTION SYSTEM

TECHNICAL FIELD OF THE INVENTION

The present invention relates to a configuration of a piston for use in an internal combustion system such as a spark ignition engine or a compression ignition engine and combination methods to use the piston.

BACKGROUND OF THE INVENTION

To power output and thermal efficiency of an internal combustion engine and to exhibit higher performance, fluid such as air has been injected into a combustion chamber at a later stage of a combustion stroke. Further, a small toroidal chamber, i.e., an energy cell, has been formed in a cylinder head of previously known internal combustion engines.

In the prior art described above, efficient combustion cannot be achieved because of the complicated structural configuration required, and therefore performance of the internal combustion system does not reach the desired level.

It is an object of the present invention to provide an improved piston structure for use in an internal combustion engine capable of improving combustion in a combustion chamber so as to obtain higher performance from the engine.

SUMMARY OF THE INVENTION

Accordingly, the invention relates to a lean-burn, internal combustion system that includes a piston having a toroidal chamber formed therein and having a restrictive orifice in a top face of the piston.

Further, the invention is directed at a lean-burn internal combustion engine comprising a main combustion chamber to which a lean mixture of fuel and air is supplied and ignition means operably located in the main combustion chamber A piston is located in a cylinder of the engine. The piston includes a toroidal chamber formed near a top face of the piston and communicating with the combustion chamber through an orifice. The invention also includes means for supplying a highly concentrated mixture of fuel and air into the combustion chamber proximate the ignition means. The ignition means ignites the highly concentrated mixture and the lean mixture in order. Combustion gas is jetted out of the toroidal chamber into the main combustion chamber later in the combustion stroke to ignite the lean mixture.

Moreover, the invention is directed at a piston for use in an internal combustion chamber having a toroidal chamber formed through a restriction or orifice located at a top face thereof.

Furthermore, the invention is directed to an ignition plug for use in a lean-burn internal combustion system comprising: a center electrode; an electric insulating body encircling the center electrode in such a manner as to expose only a leading end of the center electrode; an earth electrode arranged to provide a spark gap with the leading end of the center electrode; a cover defining an ignition chamber encircling the center electrode and the earth electrode and having a hole therein; a passageway in said body for supplying a highly concentrated mixture of fuel and air to the ignition chamber within the cover; and a no-return valve provided in the passageway for supplying the highly concentrated mixture to the ignition chamber while preventing flow through said passageway in the opposite direction.

BRIEF DESCRIPTION OF THE DRAWINGS

Other and further objects, features and advantages of the invention will be more explicit from the following detailed description taken with reference to the drawings wherein.

DETAILED DESCRIPTION OF THE INVENTION

Figure 1:
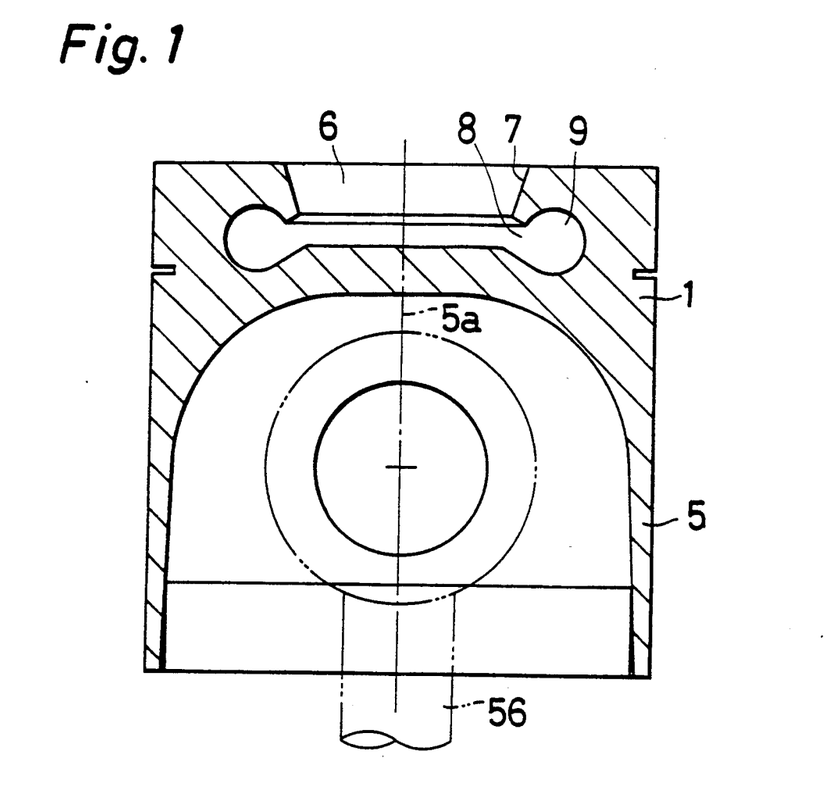
FIG. 1 is a sectional view of a piston that is constructed in accordance with the invention.
Figure 2:
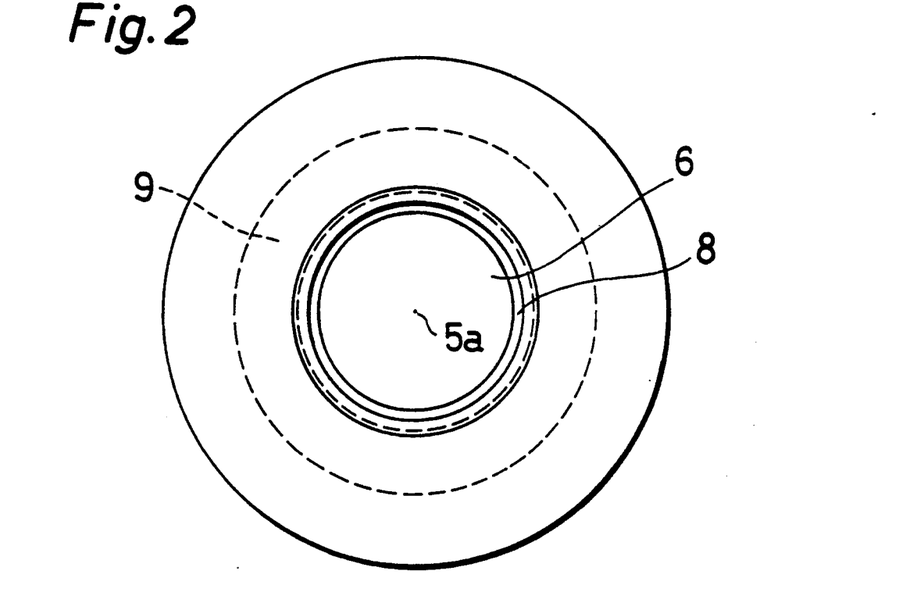
FIG. 2 is a plan view of the piston of FIG. 1.

Referring to the drawing and to FIGS. 1–4 in particular, FIG. 1 is a sectional view of a piston 1 provided in a spark ignition 4-stroke internal combustion engine system incorporating the invention. The piston 1 is provided with a skirt 5 and is pivotally connected to a connecting rod 56.

The piston 1 has a central axis 5a. In a top face of the piston 1 there is formed a tapered, circular hole 6. In the piston 1 is further formed a chamber 9, which is shaped like a doughnut or torus. The toroidal chamber 9 is connected to the hole 6 by an annular orifice 8. The orifice 8 serves as a flow restriction.

Figure 3:
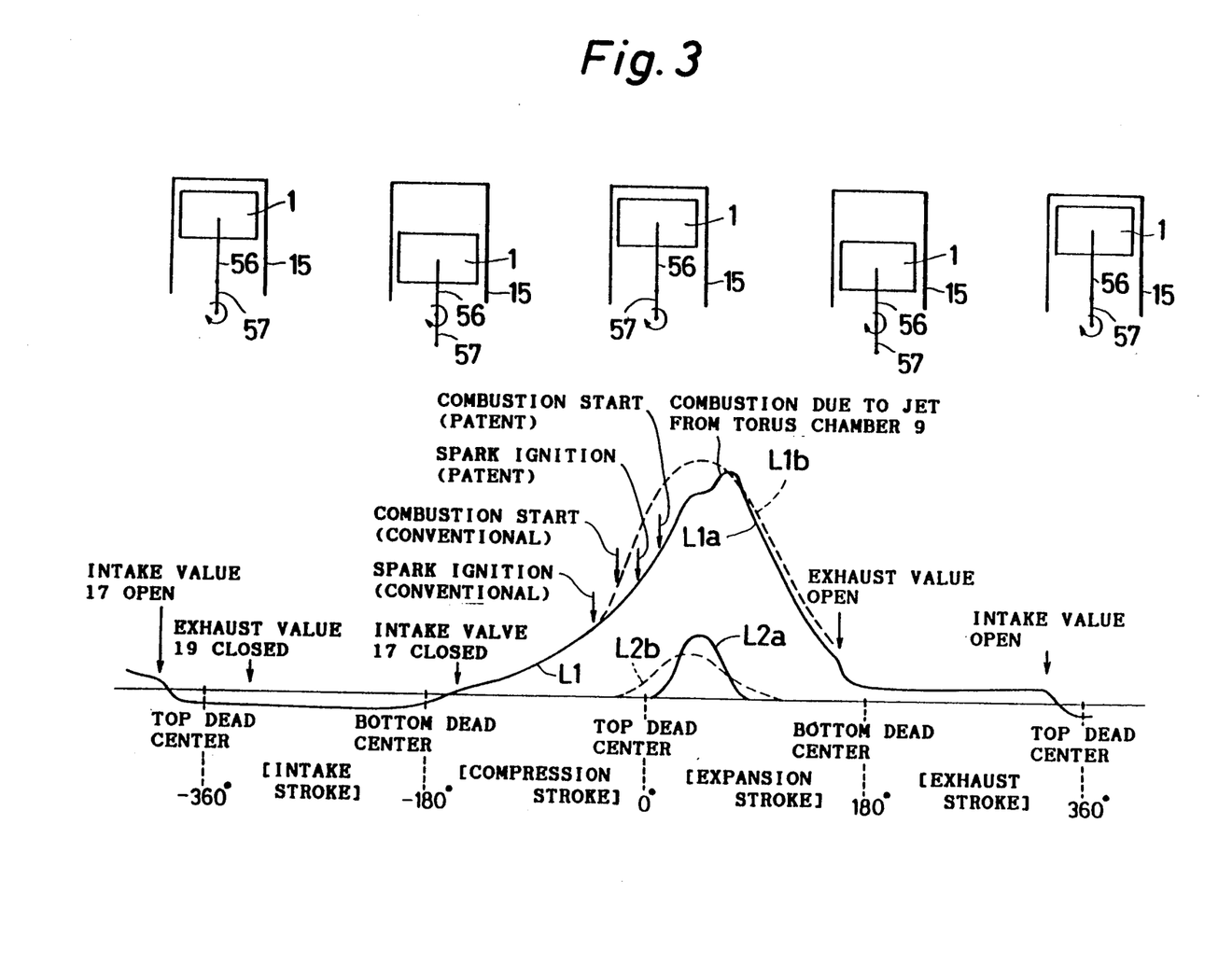
FIG. 3 is a diagram and a graph showing the operation of a spark ignition engine provided with the piston of FIG. 1.

FIG. 3 is a diagram and a graph showing the operation of the spark ignition engine. FIGS. 4A to 4D are, respectively, schematic sectional views of the spark ignition engine in various operational positions. FIG. 3 shows positions of the piston 1 in a cylinder 15. The piston i is connected to a crank shaft 57 through the connecting rod 56. The positions of the piston 1 shown in FIG. 3 also correspond to respective operating positions of the spark ignition engine shown in the graph of FIG. 3.

In the lean-burn spark ignition engine, when the piston 1 descends to bottom dead center as shown in FIG. 4A, an intake valve 17 is in its open state where an intake pipe 18 communicates with a main combustion chamber 16, supplying a lean mixture of fuel and air into the main combustion chamber 16 and somewhat into the toroidal chamber 9. As the fuel enters the chamber 16 on the intake stroke, a fuel swirl 25 is generated. At this stage, exhaust valve 19 is in a closed state, so that exhaust pipe 20 is not in communication with the main combustion chamber 16. An ignition plug 21 (see also FIG. 10) is secured to a top portion of the cylinder 15.

Highly concentrated fuel/air mixture 24 is supplied from a conduit 22 and passageway 69 through a no-return valve 23 into the main combustion chamber 16 in the vicinity of the ignition plug 21.

Figure 4:
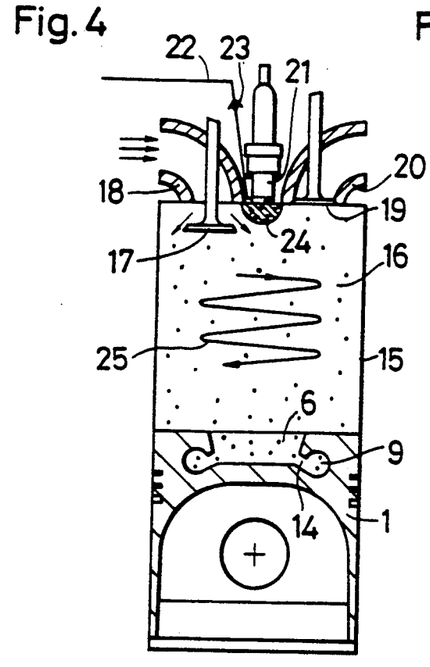
FIGS. 4A, 4B, 4C, and 4D are respectively schematic sectional views showing the operation of an engine utilizing the piston of FIG. 1.
Figure 4B:
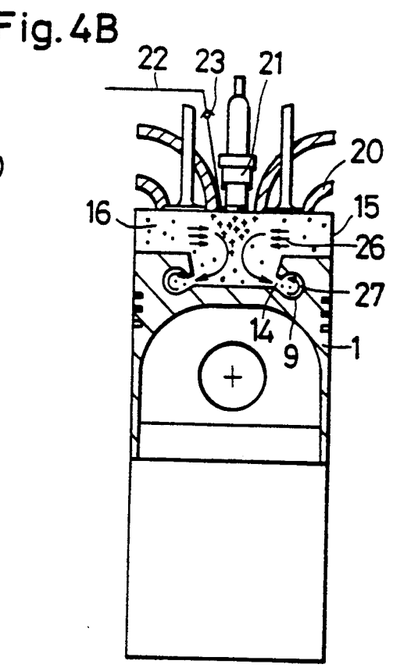

When the piston 1 ascends to effect a compression stroke as shown in FIG. 4B after reaching bottom dead center, intake valve 17 is closed and the fuel mixture in the main combustion chamber 16 is caused to move radially inward (or squish) with respect to the cylinder 15 as indicated at 26. Then, the mixture is forced into the toroidal chamber 9, which functions as a sub-combustion chamber, through the orifice 14 in the piston 1 and swirls as indicated at 27.

Figure 4C:
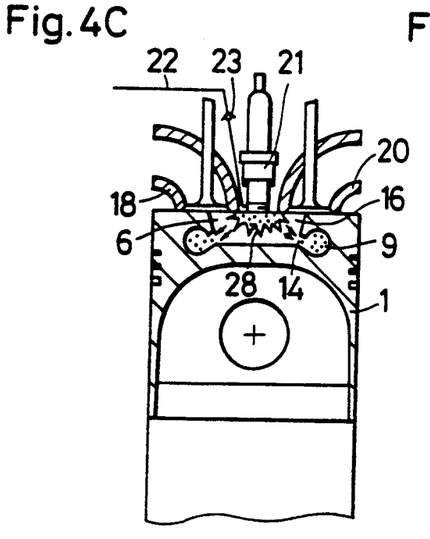

Ignition of the fuel occurs as a result of firing the ignition plug 21, which firing occurs immediately before the piston 1 reaches top dead center. Line L1 shown in FIG. 3 represents pressure in the main combustion chamber 16 of the cylinder 15. Line L2a represents a burn rate in the combustion chamber according to the invention. The highly concentrated fuel mixture in the vicinity of the ignition plug 21 is ignited by the spark of the ignition plug 21 and the flame front is propagated. The combustion stroke is shown in FIG. 4C.

Flame front 28 is propagates in the main combustion chamber 16 and reaches the toroidal chamber 9 through the hole 6 and orifice 8 in the piston 1. The fuel in the toroidal chamber 9 starts burning at that moment. The orifice 8 serves to increase the pressure of the combustion gas in the toroidal chamber 9 higher than that in the main combustion chamber 16 by restricting gas flow from the chamber 9 as the fuel in the toroidal chamber 9 burns.

Figure 4D:
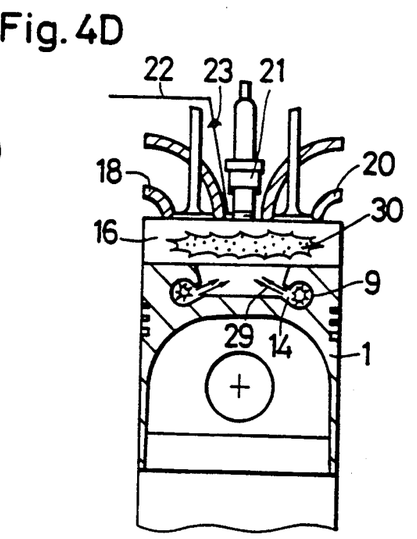

As the piston 1 descends from the top dead center, the high pressure combustion gas is jetted out of the toroidal chamber 9 into the main combustion chamber 16 through the orifice 8 as shown by an arrow 29 of FIG. 4D. The combustion gas jetted from the orifice 8 as shown by the arrow 29 creates turbulence in the main combustion chamber 16, causing the mixture 30 remaining in the main combustion chamber 16 to be further mixed with additional combustion occurring. Thus, the combustion gas is jetted from the toroidal chamber 9 to the main combustion chamber 16 through the orifice 14 at a later stage of the combustion stroke where the lean mixture in the main combustion chamber 16 is caused to burn. Accordingly, more complete combustion of the fuel mixture occurs and the power output and the thermal efficiency of the internal combustion system of the invention is improved, resulting in higher engine performance.

As will be seen from line L1a shown in FIG. 3, the pressure in the main combustion chamber 16 increases as the piston 1 descends because of the combustion gas jetted from the toroidal chamber 9 through the orifice 14, whereby the power output and the thermal efficiency of the internal combustion system is enhanced. In the prior art, where a piston is used that does not have the hole 6, orifice 8, and toroidal chamber 9 formed therein, the pressure in the main combustion chamber 16 does not increase as discussed, but decreases as indicated by line L1b and the power output and the thermal efficiency of the prior art internal combustion system cannot be improved.

As will be clear from line L2a representing burn rate, the burn rate can be improved as shown by a line L2a on the ground that the combustion gas of high pressure is jetted out of the toroidal chamber 9 into the main combustion chamber 16 through the orifice 14. On the contrary, the burn rate cannot be improved as shown by a line L2b in the case where a prior art piston is used which does not have the hole 6, orifice 8, and toroidal chamber 9 formed therein.

After the expansion stroke of the internal combustion system, the piston 1 descends to reach bottom dead center. Thereafter, the piston 1 ascends to open exhaust valve 19 to effect the exhaust stroke. The operation of the four-stroke internal combustion system is executed repeatedly in this manner.

The foregoing embodiment has the following advantages:

(a) The hole 6, orifice 8, and toroidal chamber 9 are configured symmetrically with respect to the axis 5a of the piston 1. Accordingly, combustion gas of high pressure is jetted from the toroidal chamber 9 into the main combustion chamber 16 through the orifice 8 symmetrically with respect to the axis 5a of the piston 1. Therefore, the mixture in the main combustion chamber 16 is uniformly mixed, resulting in improved combustion.

(b) The use of the toroidal chamber 9 when constructed according to the invention assures a sufficient volume in the toroidal chamber 9 to enhance the energy generated by jetting the combustion gas of high pressure out of the toroidal chamber 9, whereby greater mixing occurs and combustion of the fuel is improved.

(c) It is possible to vary the jet velocity and jet timing of the high pressure combustion gas out of the toroidal chamber 9 by changing the configuration and the volume of the toroidal chamber 9 and of the orifice 14.

(d) The compression ratio of the engine can be changed by changing the volume of the toroidal chamber 9.

(e) The hole 6, orifice 14, and toroidal chamber 9 can be easily manufactured into the piston 1, resulting in excellent productivity.

In a lean-burn spark ignition engine including piston 1 and plug 21 shown in FIGS. 1 to 4, the thermal efficiency is improved about 10 percent over an engine without the plug 21 and piston 1. Further, the internal combustion system so configured can continue to operate in a stable manner at a lean mixture of 30 to 40 percent, compared to a prior art internal combustion system.

Figure 5:
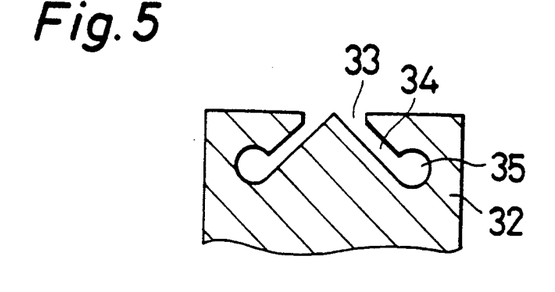
FIG. 5 is a fragmentary, sectional view of another embodiment of a piston also constructed in accordance with the invention.

FIG. 5 is a sectional view of a piston 32 of another embodiment of the invention. At a top face of the piston 32 is formed a hole 33. The hole 33 communicates with a toroidal chamber 35, which is concentric with the hole 33, through an annular passageway 34 which serves as a restriction.

Figure 6:
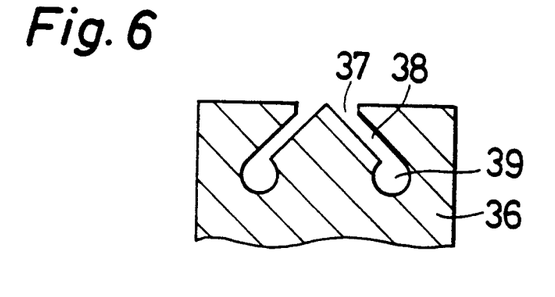
FIG. 6 is a fragmentary, sectional view of still another embodiment of a piston also constructed in accordance with the invention.

FIG. 6 is a sectional view of a piston 36 of still another embodiment of the invention. A hole 37 formed in a top face of the piston 36 communicates with a toroidal chamber 39 through an annular orifice or passageway 38 which serves as a restriction.

Figure 7:
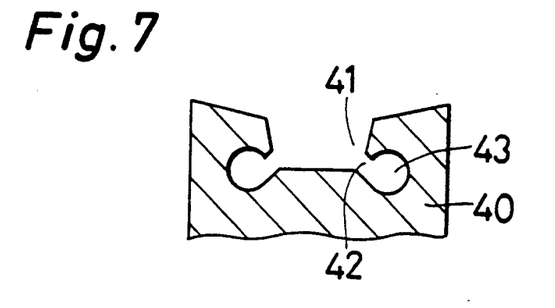
FIG. 7 if a fragmentary, sectional view of yet another embodiment of a piston also constructed in accordance with the invention.

FIG. 7 is a sectional view of a piston 40 of yet another embodiment of the invention. A hole 41 formed in a top face of the piston 41 communicates with a toroidal chamber 43 through an annular orifice 42.

Figure 8:
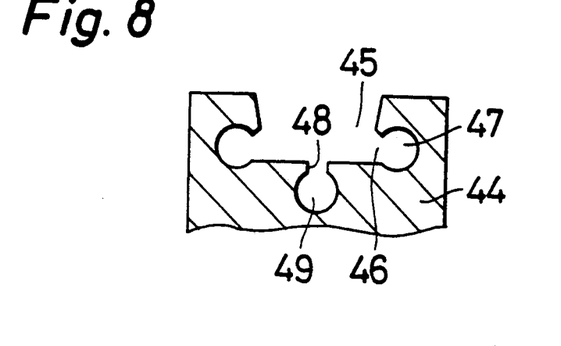
FIG. 8 is a fragmentary, sectional view of a further embodiment of a piston also constructed in accordance with the invention.

FIG. 8 is a sectional view of a piston 44 of a further embodiment of the invention. A hole 45 formed in a top face of the piston 44 communicates with a toroidal chamber 47 through an orifice 46. Further, in this embodiment, another chamber 49 is formed in a substantially spherical shape on an axis of the piston 44. The chamber 49 is in communication with the hole 45 through another orifice 48. This construction also enables an internal combustion system to have high performance similar to the foregoing embodiments.

Figure 9:
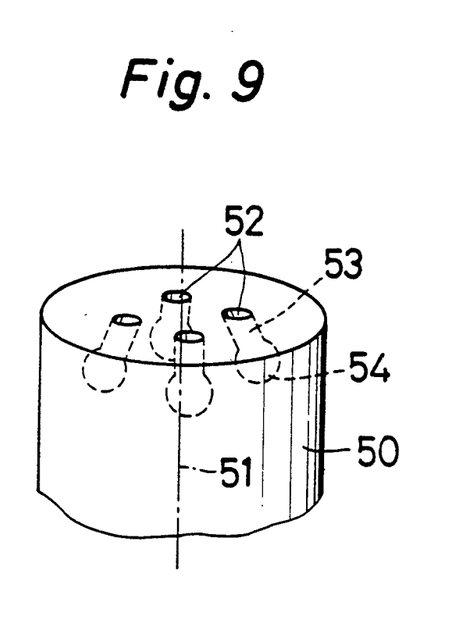
FIG. 9 is a fragmentary, perspective view of still another embodiment of a piston that is also constructed in accordance with the invention.

FIG. 9 is a schematic perspective view of a piston 50 of still another embodiment of the invention. In a top face of the piston 50 are formed a plurality of angularly oriented holes 52 about an axis 51 of the piston 50. Centers of the plurality of holes 52 are located on a phantom circle whose center is the axis 51. The holes 52 respectively communicate with corresponding chambers 54 formed in a substantially spherical shape through passages 53 which function as restrictions. The holes 52, passages 53, and chambers 54 are spaced from one another at a predetermined distance in a circumferential direction of the piston 50, and formed symmetrically with respect to the axis 51.

Figure 10:
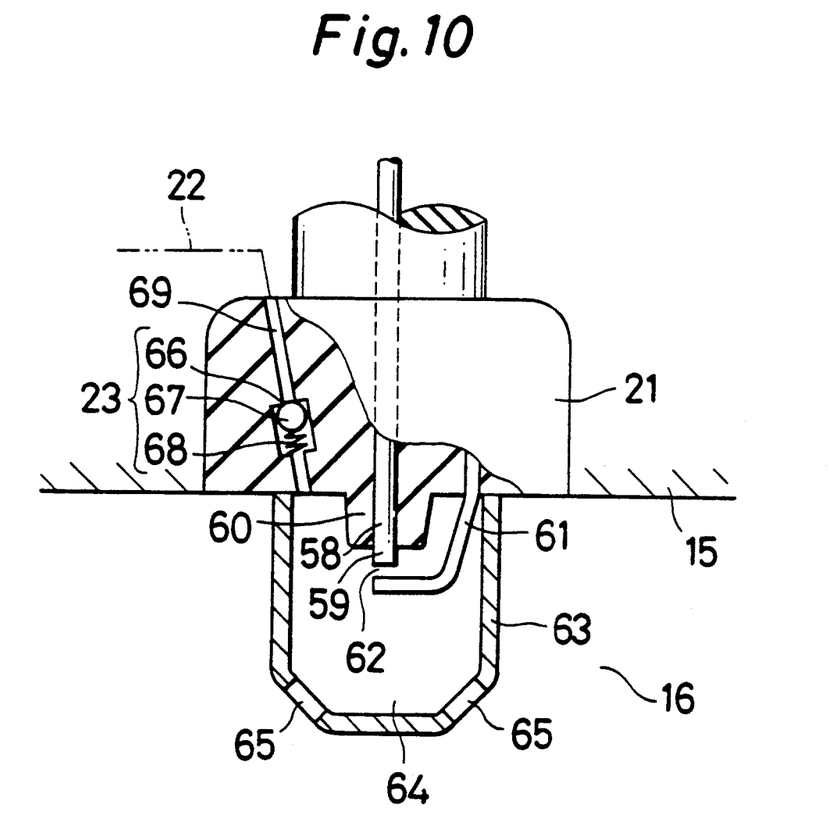
FIG. 10 is an enlarged, fragmentary, sectional view of an ignition plug that is constructed in accordance with the invention.

FIG. 10 is a sectional view showing a specific configuration of an ignition plug 21. The ignition plug 21 includes a center electrode 58, an electric insulating body 60 consisting of electric insulating material, and an earth electrode 61 secured to the electric insulating body 60. The electric insulating body 60 encircles the center electrode 58 entirely except for an exposed leading end portion 59. The earth electrode 61 is arranged in such a manner as to provide a spark gap 62 between the leading end portion 59 of the center electrode 58 and the earth electrode 61.

The leading end portion 59 of the center electrode 58 and the earth electrode 61 are encircled by a cover 63, which defines an ignition chamber 64. The cover 63 may be made of electric insulating material, or of metal. A hole or an orifice 65 through the cover 63 provides for communication between the ignition chamber 64 and the main combustion chamber 16.

The ignition plug 21 is further provided with a one-way or no-return valve 23. The no-return valve 23 includes a valve seat 66, a spherical valve body 67 capable of seating on the valve seat 66, and a spring 68 for pressing the valve body 67 against the valve seat 66. A passageway 69, formed in the electric insulating body 60, extends into the ignition chambers 64 so as to communicate therewith. The no-return valve 23 is provided in a specified position in the conduit 69. The conduit 69 is connected to a conduit 22 so that a highly concentrated fuel mixture (having an air/fuel ratio of about 1) is supplied to the ignition chamber 64. The cover 63 is arranged to separate the highly concentrated fuel mixture supplied to the ignition chamber 64 through the passageway 69 from the lean mixture in the main combustion chamber 16, thereby preventing the highly concentrated mixture from becoming lean by being mixed with the lean mixture in the main combustion chamber 16. Accordingly, the ignition of the plug 21 ignites the highly concentrated mixture in ignition chamber 64.

In another embodiment of the invention (not shown) wherein the cover 63 is not provided, it is appropriate to supply through the passageway 69 and the no-return valve 23 a highly concentrated mixture whose air/fuel ratio is less than 1. Further, the no-return valve 23 may be provided in a specified position in the conduit 22 connected to the ignition plug 21, instead of being located in the ignition plug 21.

According to the invention, the toroidal chamber is formed in the piston and communicates through the restriction or orifice at the top face of the piston. This provides the following advantage in, for example, a spark ignition engine. At the moment when the propagated flame front reaches the toroidal chamber after ignition, the fuel in the chamber starts burning. Thereby, the pressure of the combustion gas burned in the toroidal chamber increases and exceeds the pressure in the main combustion chamber outside the toroidal chamber, whereby the combustion gas of high pressure is jetted out of the toroidal chamber into the main combustion chamber through the restriction. The combustion gas jetted through the restriction generates the turbulence in the main combustion chamber. The generated turbulence in turn increases the fuel burn rate in the main combustion chamber, contributing to improved combustion therein. This enables the internal combustion system to increase the power output and the thermal efficiency thereof, with the result that the internal combustion system can exhibit higher performance. Further, the increased fuel burn rate allows the ignition to be delayed. Accordingly, generation of nitrogen oxides ($NO_x$) and hydrocarbon (HC) can be suppressed. A similar operation is executed in a compression ignition engine or other internal combustion system.

In the internal combustion system, the lean mixture is used in order to reduce $NO_x$ in the emissions. In this case, it is required that the combustion of the lean mixture be completed in a shortest possible time in order to increase the thermal efficiency and the power output. Generally, in the case where the lean mixture is to be burned in a short time, the combustion temperature increases. Accordingly, there is high likelihood that $NO_x$ concentration in the emissions increases. In order to solve these problems, the present invention is constructed as described above. That is, the highly concentrated mixture is ignited with the use of the ignition plug, whereby the flame in the main combustion chamber expands into the toroidal chamber formed in the piston. Subsequently, burning occurs in the toroidal chamber, which causes the flame in the toroidal chamber to expand into the main combustion chamber. After the flame expands into the main combustion chamber from the toroidal chamber, the temperature in the main combustion chamber is lower than the highest temperature at the initial time of explosion in the toroidal chamber. In this way, the burn rate of the lean mixture in the main combustion chamber is increased by the jetted combustion gas from the toroidal chamber. Consequently, the thermal efficiency and the power output of the internal combustion system increase. Further, the temperature in the main combustion chamber is lower than the highest temperature at the initial time of combustion, after the combustion gas is jetted from the toroidal chamber to the main combustion chamber as described above.

Accordingly, the concentration of $NO_x$ increases in the emissions generated in the main combustion chamber can be reduced. The combustion gas is high in temperature at the time of combustion of the highly concentrated mixture with the use of the ignition plug and the combustion in the toroidal chamber. However, since the volume of the mixture at the time of these combustions is relatively small, generation of $NO_x$ can be suppressed. Thus, the thermal efficiency can be increased while reducing generation of $NO_x$.

The invention can be incorporated into not only a four-stroke internal combustion system, but also a two-stroke internal combustion system.

Further, the invention can be incorporated into not only a gasoline spark ignition engine, but also other engines such as a diesel engine.

Moreover, in the ignition plug according to the invention, the center electrode and the earth electrode are disposed in such a manner as to provide the spark gap between the leading end of the center electrode and the earth electrode through the insulating body. The leading end of the center electrode and the earth electrode are encircled by the cover having holes formed therein, defining the ignition chamber. A highly concentrated mixture is supplied to the ignition chamber through the passageway and the no-return valve. Accordingly, mixing of the highly concentrated fuel mixture with the lean mixture in the main combustion chamber before ignition is prevented. Therefore, the highly concentrated mixture can be reliably ignited by the spark or ignition plug.

As set forth above, according to the invention, the toroidal chamber communicates with the combustion chamber through the restriction at the top face of the piston. Accordingly, at the moment when the propagated flame front in the main combustion chamber reaches the toroidal chamber, the fuel in the toroidal chamber starts burning. The pressure of the combustion gas burned in the toroidal chamber increases and exceeds the pressure in the main combustion chamber outside the toroidal chamber, whereby high pressure combustion gas is jetted out of the toroidal chamber into the main combustion chamber through the restriction or orifice. The combustion gas jetted through the restriction generates turbulence in the main combustion chamber and contributes to improved combustion in the main combustion chamber through better mixing. This increases the power output of the system, with the result that an internal combustion system having higher performance can be realized. This configuration of the piston is simple, thus the invention can be easily manufactured. Moreover, the restriction and the toroidal chamber are formed at the top surface of the piston, and therefore manufacturing of such a piston is easy.

The invention may be embodied in other specific forms without departing from the spirit or essential characteristics thereof. The present embodiments are therefore to be considered in all respects as illustrative and not restrictive, the scope of the invention being dictated by the appended claims rather than by the foregoing description and all changes which come within the meaning and the range of equivalency of the claims are therefore intended to be embraced therein.

What is claimed is:

1. A lean-burn internal combustion system comprising:
    a main combustion chamber to which a lean mixture of fuel and air is supplied;
    an ignition plug operably associated with said main combustion chamber;
    a piston including a piston body having a toroidal chamber formed in said piston body and a flow restriction located in said piston body between said chamber and a top orifice of said piston body;
    means for supplying a highly concentrated mixture of fuel and air to the vicinity of the ignition plug;
    means for supplying a lean fuel/air mixture into said combustion chamber; and
    means for firing said ignition plug to burn the highly concentrated mixture and, subsequently, burning the lean mixture whereby combustion gas is jetted out of the toroidal chamber into the main combustion chamber at a later stage of combustion period of the lean mixture to mix with the lean mixture thereby increasing burning efficiency in said main combustion chamber.

2. The system of claim 1 wherein said ignition plug includes:
    an electric insulating body;
    a center electrode located in said insulating body with a leading end portion of said center electrode projecting from said insulating body;
    an earth electrode located to provide a spark gap with the leading end portion of said center electrode;
    a cover defining an ignition chamber encircling the center electrode and the earth electrode and having a hole extending therethrough;
    a passageway in said insulating body for supplying the highly concentrated mixture of fuel and air to said ignition chamber; and
    a no-return valve located in said passageway.

3. The system of claim 1 wherein said ignition plug includes:
    an electric insulating body;
    a center electrode located in said insulating body with a leading end portion of said center electrode projecting from said insulating body;
    an earth electrode located to provide a spark gap with the leading end portion of said center electrode;
    a passageway in said insulating body for supplying the highly concentrated mixture of fuel and air to said system; and
    a no-return valve located in said passageway.

4. The system of claim 1 wherein said flow restriction comprises an elongated, annular passageway intersecting said opening at one end and tangentially intersecting an upper diameter of said toroidal chamber.

5. The system of claim 1 wherein said flow restriction comprises an elongated, annular passageway intersecting said opening at one end and tangentially intersecting a lower diameter of said toroidal chamber.

6. A lean-burn internal combustion system comprising:
    a main combustion chamber to which a lean mixture of fuel and air is supplied;
    an ignition plug operably associated with said main combustion chamber;
    a piston including a piston body having a plurality of spherical chambers located generally symmetrically about a central piston axis;
    means for supplying a highly concentrated mixture into said combustion chamber proximate said ignition plug;
    means for supplying a lean fuel/air mixture into said combustion chamber; and
    means for firing said ignition plug to burn the highly concentrated mixture and, subsequently, burning the lean mixture whereby combustion gas is jetted out of the spherical chambers into the main combustion chamber at a later stage of the combustion period of the lean mixture to mix with the lean mixture thereby increasing burning efficiency in said main combustion chamber.

7. A piston for a lean-burn internal combustion system comprising:
    a piston body having a top face;
    a toroidal chamber formed within said piston body;

an opening extending from said top face into said chamber;

a spherical chamber located generally centrally of said piston body;

an orifice connecting said spherical chamber with said opening; and flow restriction means located in said piston body between said toroidal chamber and said opening.

* * * * *